March 8, 1966     G. JONSSON     3,238,561
METHOD FOR CLEANING SHRIMP
Original Filed Jan. 28, 1963     6 Sheets-Sheet 1
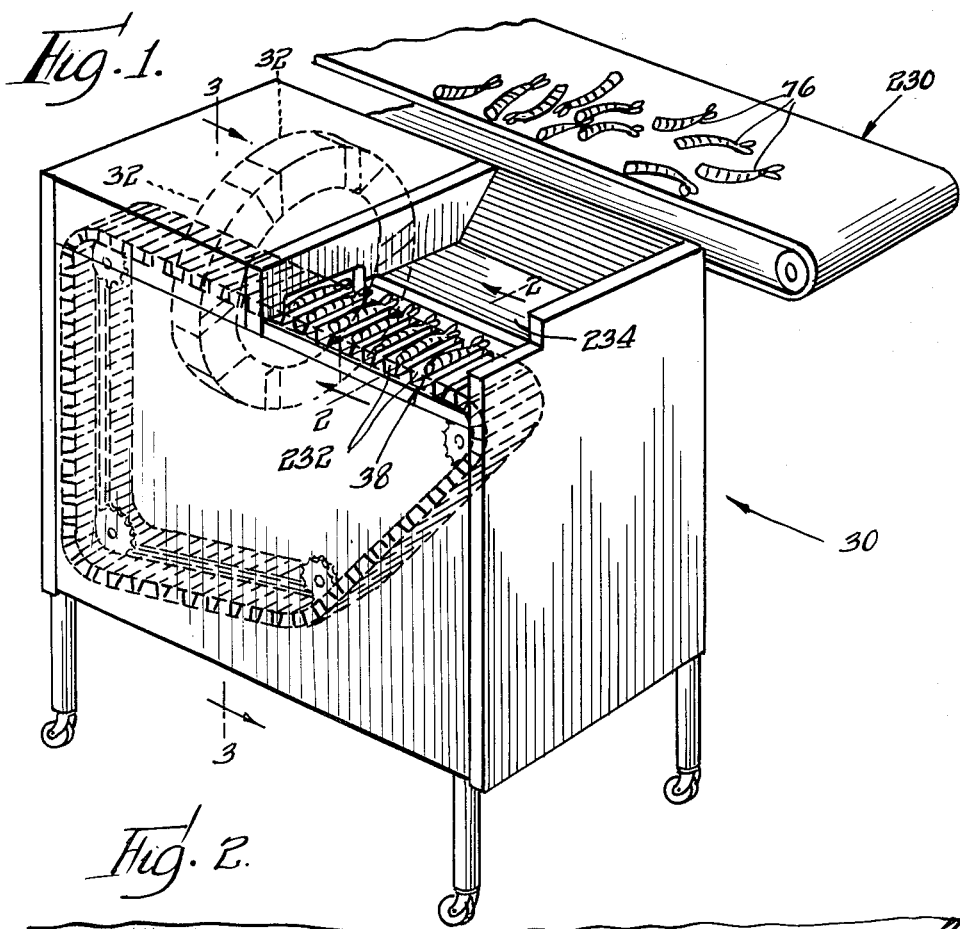
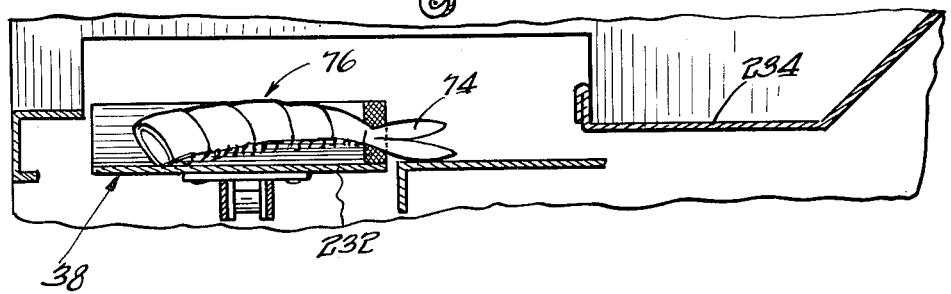
INVENTOR.
Gregor Jonsson
BY
Olson, Trexler, Wolters & Bushnell
attys.

March 8, 1966  G. JONSSON  3,238,561
METHOD FOR CLEANING SHRIMP
Original Filed Jan. 28, 1963  6 Sheets-Sheet 2
Fig. 3.
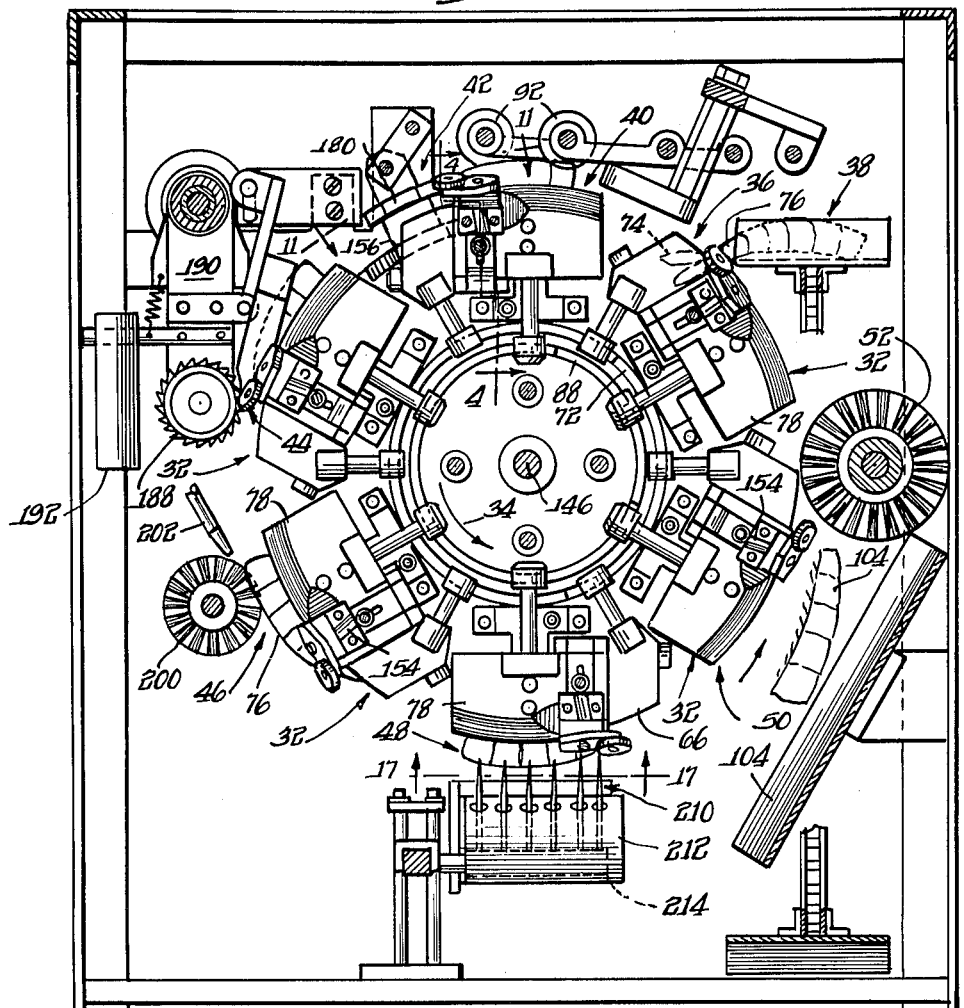
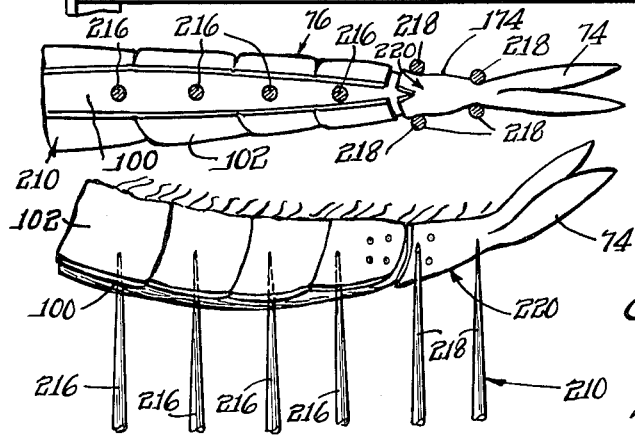
Fig. 17.
Fig. 18.
INVENTOR.
Gregor Jonsson
BY
Olson, Trexler
Wolters & Bushnell
attys.

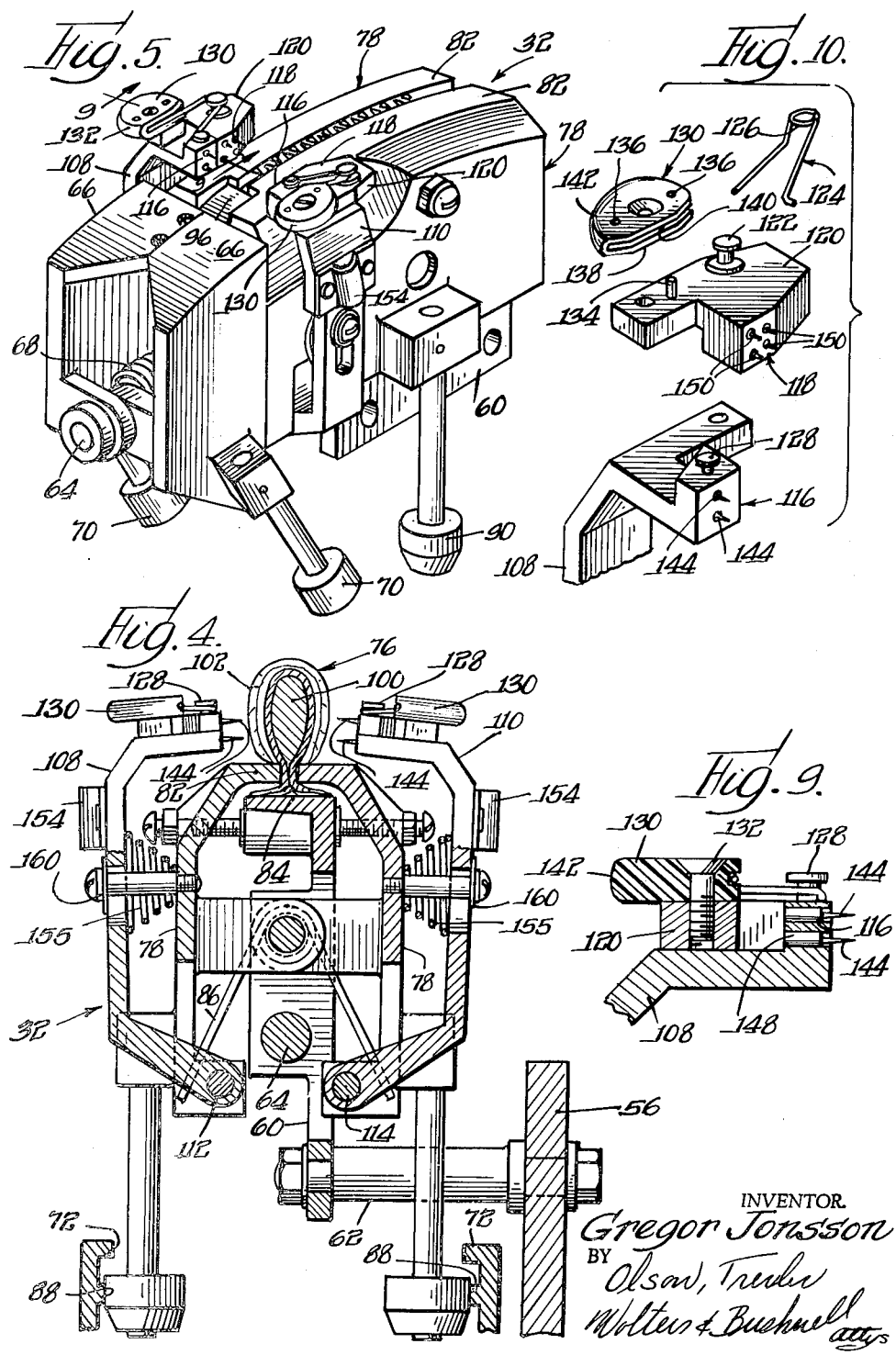

March 8, 1966  G. JONSSON  3,238,561
METHOD FOR CLEANING SHRIMP
Original Filed Jan. 28, 1963  6 Sheets-Sheet 4
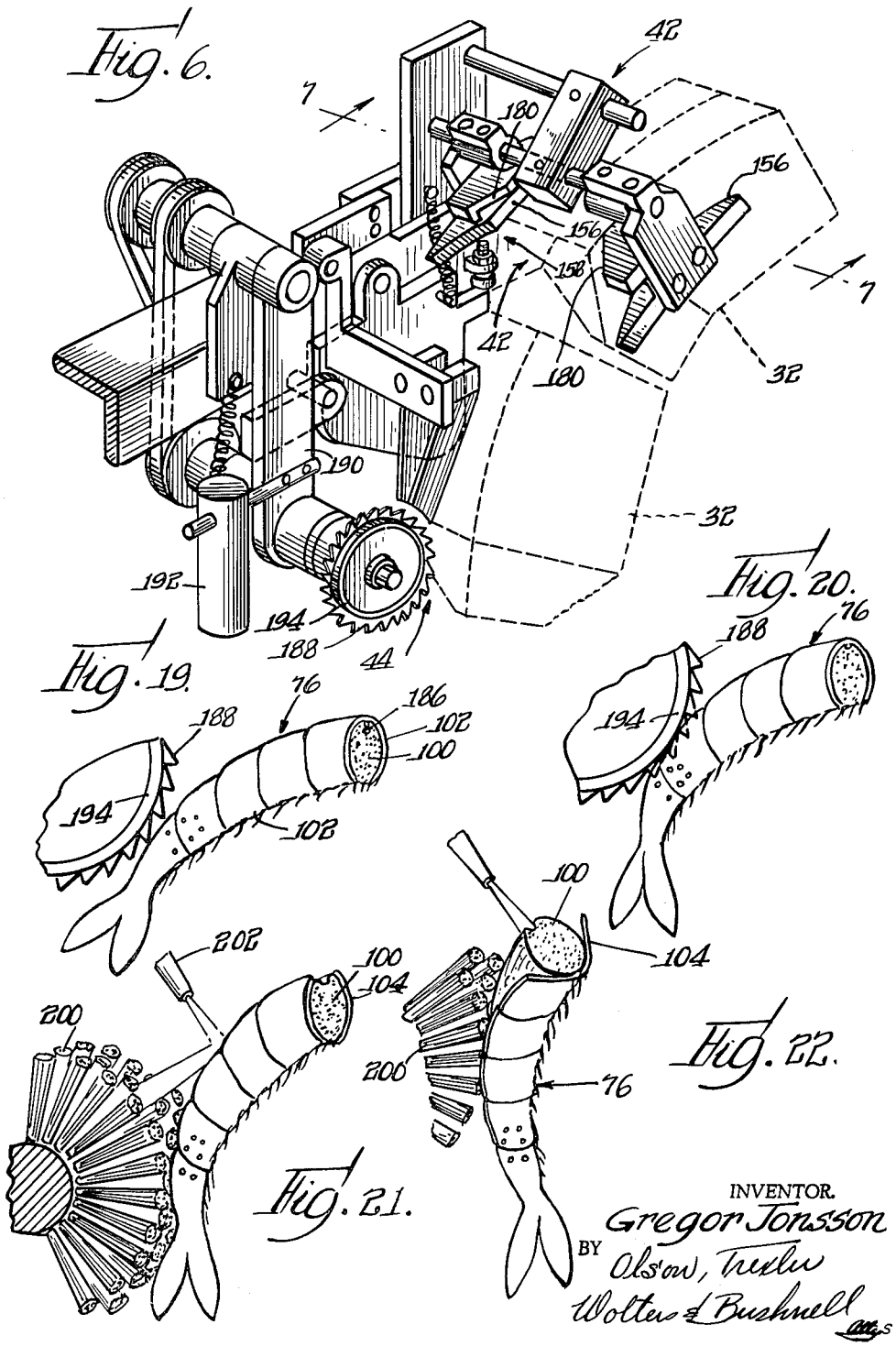
INVENTOR.
Gregor Jonsson
BY Olson, Trexler
Wolters & Bushnell
Attys

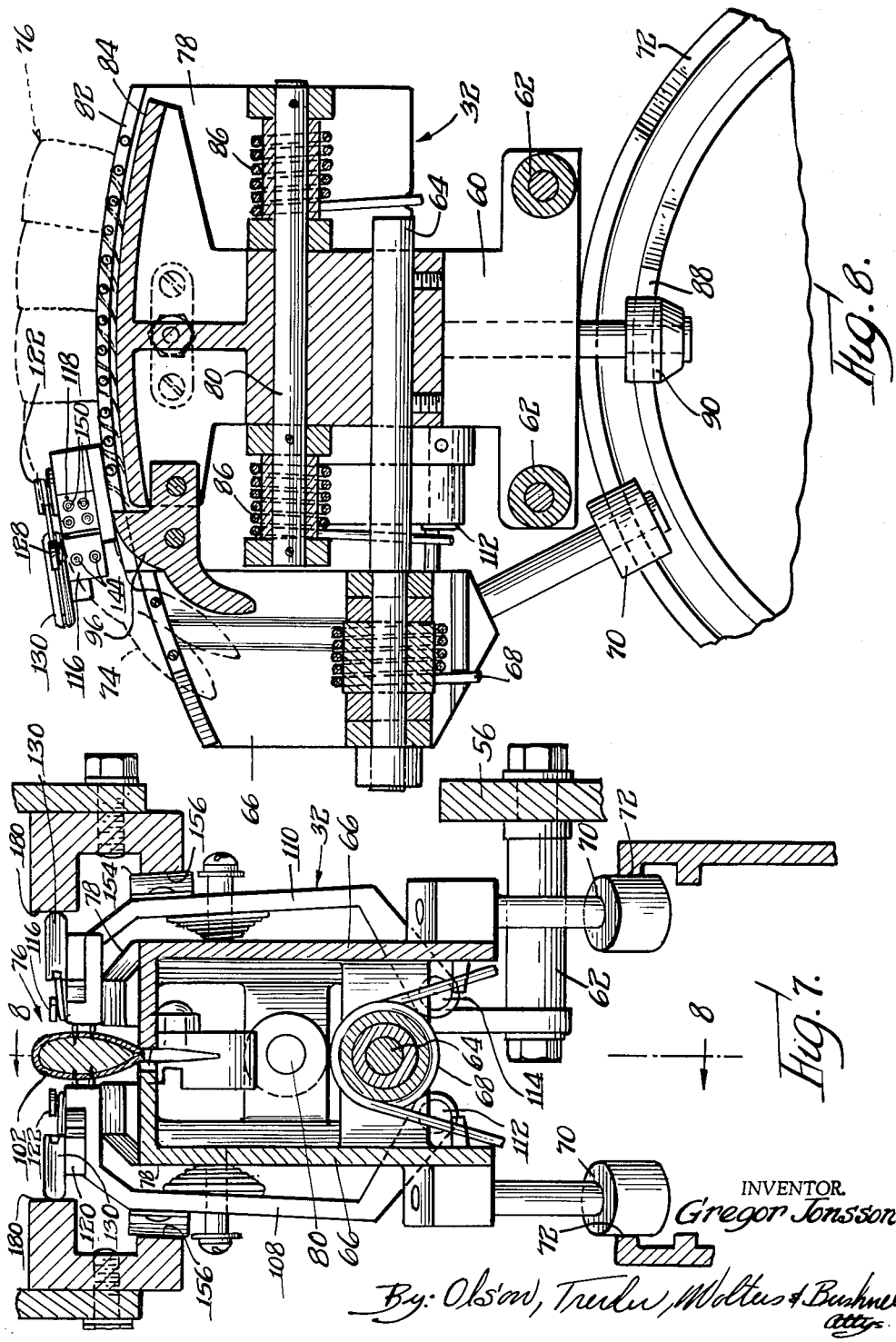

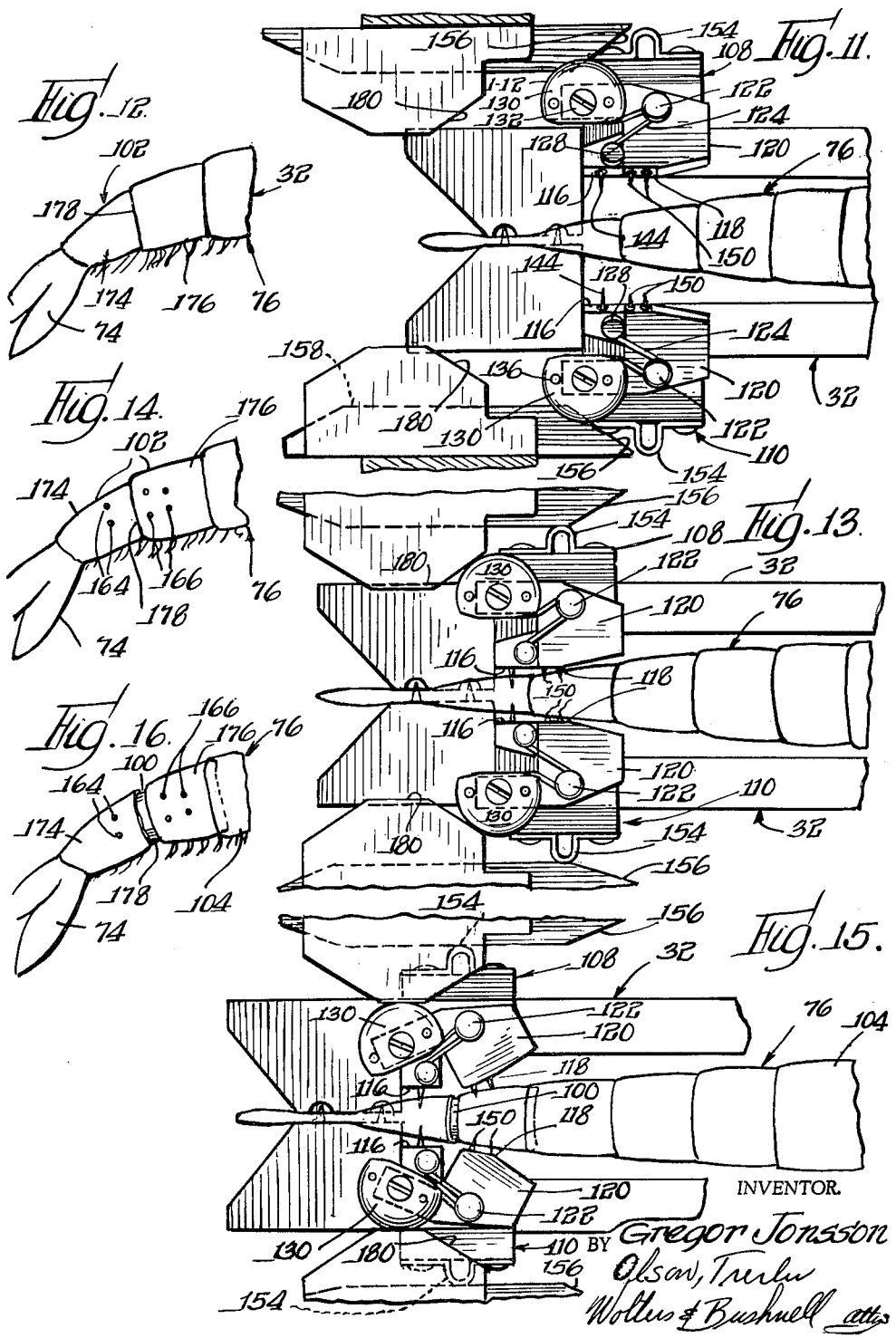

United States Patent Office 3,238,561
Patented Mar. 8, 1966

3,238,561
METHOD FOR CLEANING SHRIMP
Gregor Jonsson, 1520 Berkeley Road,
Highland Park, Ill.
Original application Jan. 28, 1963, Ser. No. 254,094.
Divided and this application Dec. 8, 1964, Ser. No. 416,756
8 Claims. (Cl. 17—45)

This application is a division of applicant's copending application Serial No. 254,094, filed January 28, 1963.

The present invention relates to a method for cleaning shrimp.

One object of the invention is to provide a new and improved method for cleaning shrimp on a mass production basis to provide cleaned shrimp consisting of cleaned bodies of shrimp flesh from which the shrimp shells have been removed, and to which the tails of the shrimp remain attached.

Another object is to provide a shrimp cleaning method in which the shell of individual shrimp is disjointed in an improved manner to facilitate removal of the main portion of the shrimp shell from the flesh body of the shrimp while leaving the tail of the shrimp attached to the flesh body.

Another object is to provide for producing cleaned bodies of shrimp flesh from which the shrimp shells have been removed and to which the shrimp tails remain attached, an improved shrimp cleaning method that provides for disjointing the shell of individual shrimp adjacent the shrimp tail in a new and improved manner which avoids significant weakening of the shrimp flesh which holds the shrimp tail attached to the flesh body of the shrimp.

Another object is to provide, for producing cleaned bodies of shrimp flesh with the shrimp tails attached, a new and improved shrimp cleaning method in which the strength of the shell of each shrimp in longitudinal tension is effectively disrupted near the tail of the shrimp by longitudinally stretching or tensioning a segment of the shrimp shell adjacent the shrimp tail until the longitudinal strength of the shell is permanently disrupted near the shrimp tail.

A further object is to provide a new and improved shrimp cleaning method, as recited in the previous objects, which is well adapted to be carried out by automatic machinery.

Other objects and advantages will appear from the following description of the invention taken with reference to the drawings, in which:

FIGURE 1 is a perspective view of a shrimp cleaning machine constructed in accordance with the invention, certain internal components of the machine being illustrated in phantom lines for convenience in picturization;

FIG. 2 is a detail sectional view on an enlarged scale, taken with reference to the line 2—2 of FIG. 1;

FIG. 3 is a transverse vertical sectional view on an enlarged scale of the machine, taken with reference to the line 3—3 of FIG. 1;

FIG. 4 is a fragmentary sectional view on a still larger scale, taken generally with reference to the line 4—4 of FIG. 3 and illustrating a shrimp gripped along its underside by one of the shrimp holding units in the machine;

FIG. 5 is a perspective view of a typical shrimp holder or holding unit such as the one illustrated in FIG. 4;

FIG. 6 is a perspective view on an enlarged scale showing the relationship of shrimp holding units, illustrated in block form by dotted lines, to shrimp deveining structure and cam actuators for effecting disjointing of the shrimp shells;

FIG. 7 is a fragmentary sectional view on an enlarged scale, taken with reference to the line 7—7 of FIG. 6, and showing the relationship of the shell disjointing structure on a typical holding unit to coacting cam actuators;

FIG. 8 is a longitudinal sectional view of a typical shrimp holding unit, taken with reference to the line 8—8 of FIG. 7;

FIG. 9 is a fragmentary sectional view on an enlarged scale, taken with reference to the line 9—9 of FIG. 5;

FIG. 10 is an exploded perspective view on a still larger scale of shrimp shell clutching and disjointing structure providing on each holding unit to engage one side of a shrimp shell;

FIG. 11 is a detail sectional view on an enlarged scale, taken with reference to the line 11—11 of FIG. 3, and illustrating a shrimp as it is picked up by a typical holding unit in the shrimp pickup or receiving station;

FIG. 12 is a side view of the tail portion of a shrimp in the general position it occupies as the shrimp is picked up by the holding unit structure illustrated in FIG. 11;

FIG. 13 is a sectional view similar to FIG. 11, but illustrating a later phase in the movement of the holding unit as the shell disjointing clutches are engaged with the shrimp shell;

FIG. 14 is a view similar to FIG. 12, but illustrating in the side of the shrimp shell the impression of shell piercing tines of the shell clutches;

FIG. 15 is a view similar to FIG. 13, but illustrating a succeeding phase in the movement of the shrimp holding unit in which shell clutches are operated to disjoint the shell of the shrimp near the tail of the shrimp.

FIG. 16 is a side view of a shrimp similar to FIG. 14, but illustrating the manner in which the shell is disjointed near the shrimp tail by longitudinal pulling forces in the manner shown in FIG. 15;

FIG. 17 is a fragmentary sectional view on an enlarged scale, taken with reference to the line 17—17 of FIG. 3, and illustrating the manner in which the flesh body and tail of a shrimp are engaged and held against continued movement while the main portion of the shrimp shell is slipped longitudinally off the flesh body and tail of the shrimp;

FIG. 18 is a side view on an enlarged scale of the shrimp and the flesh body and tail holding structure illustrated in FIG. 17;

FIG. 19 is a detail side view on an enlarged scale illustrating the approach of a typical shrimp to a shell ripping and deveining element in the machine;

FIG. 20 is a view similar to FIG. 19, but illustrating a later phase in the movement of a typical shrimp past the shell ripping and deveining element;

FIG. 21 illustrates an early phase in the relationship of a shrimp to debris removing structure approached by a typical shrimp after leaving the deveining element of FIGS. 19 and 20; and FIG. 22 is a fragmentary perspective view similar to FIG. 21 but illustrating a later phase in the progress of a typical shrimp past the debris removing structure.

Referring to the drawings in greater detail, the shrimp cleaning machine 30 constructed in accordance with the invention and illustrated in FIG. 1 comprises an annular series of shrimp holders or holding units 32 which are supported and rotated in an annular path in the machine.

Having reference to FIG. 3, the shrimp holding units 32 are continuously moved or circulated in a counterclockwise direction, indicated by the arrow 34, in a closed annular path wherein the holding units are carried in succession through a sequence of working stations or zones where significant functional operations are preformed. The working station or zone which can be most logically considered as being the first of the sequence of stations through which each holding unit 32 passes is a shrimp pickup or supply station 36, FIG. 3. Successive holding units 32 moving through the shrimp pickup station 36 pick up individual shrimp supplied to the station 36 in a manner to be described by an endless conveyor 38 operated in synchronism with the holding units. From the pickup station 36, each holding unit 32 passes through a main shell clamping station 40 where the under-belly of the shrimp previously picked up is firmly clamped in the holding unit.

Immediately after it is clamped along its under-belly or ventral side in the station 40, each shrimp is carried through a shell disjointing station or zone 42 wherein the shell of the shrimp is disjointed by opposed longitudinal forces applied to the shrimp in a manner to be described.

After the shell of each shrimp is disjointed near the tail of the shrimp in the zone 42, the shrimp is carried by its holding units 32 on to a shell ripping and deveining station 44 where the shell of the shrimp is longitudinally ripped open along its dorsal side and the sand vein of the shrimp removed.

Each shrimp passes from the shell ripping and deveining station 44 to a cleaning station 46 where the flesh body of the shrimp is washed and scrubbed to remove debris.

Shrimp cleaned and washed at the station 46 are carried on to a shell removing station 48, where the flesh body and tail of each shrimp are temporarily restrained against continuous movement, while movement of the main portion of the shrimp shell is continued to slip the shrimp shell longitudinally off the flesh body of the shrimp, leaving the shrimp tail attached to the flesh body. The cleaned flesh body and tail of each shrimp are retracted from the position wherein they are restrained temporarily in the shell removing station 48 by means to be described. The main portion of the shrimp shell is carried on to a shell release station 50 where the shrimp shell is released from the coacting holding unit 32, which then passes by a cleaning brush 52 before reaching the shrimp pickup station 36 to pick up the next shrimp.

The annular series of shrimp holding units 32 are supported and rotated through the annular path of the units by support and drive structure disclosed in detail in applicant's pending application Serial No. 41,304, filed July 7, 1960, now Patent No. 3,122,777, issued March 3, 1964. As shown in FIG. 4, each shrimp holding unit 32 is mounted on a supporting rotor 56, forming a part of driving structure for which a detailed disclosure may be obtained by reference to the above mentioned patent application.

As shown in FIGS. 4 and 5, each shrimp holding unit or holder 32 comprises a central support frame or member 60 securely mounted on the rotor 56 in an offset position with respect to the rotor by two horizontal supports 62.

An inner pivot support shaft 64 mounted in the support frame 60 of each shrimp holder 32, as shown in FIG. 8, cantilevers forwardly with respect to the normal direction of rotary movement of the holder to provide pivotal support to a pair of mutually opposed shrimp tail clamping jaws 66 biased toward each other by a spring 68. Two cam followers 70 fixed to the respective tail clamping jaws 66 project radially inward into coacting relation to two opposed stationary cams 72 which operate on the cam followers to effect synchronization of movement of the tail clamping jaws toward and away from each other, as an incident to orbiting of the corresponding shrimp holding unit 32 in its annular path.

As each shrimp holding unit 32 approaches the shrimp pickup station 36, the tail clamping jaws 66 of the unit are held apart from each other by the action of the cams 72 on the associated cam followers 70. Hence, upon entering the shrimp pickup station 36, the tail clamping jaws 66 of each unit 32 receive therebetween the tail 74 of a shrimp 76 moved into the pickup station in synchronism with the shrimp holding unit. Upon moving into embracing relation to a shrimp tail 74 in the pickup station 36, the tail clamping jaws 66 are swung toward each other to clamp the shrimp tails by virtue of the shaping of the cams 72 in conjunction with the action of the corresponding jaw actuating spring 68.

A shrimp 76 thus clamped by its tail 74 in the pickup station 36 is positively pulled by the jaws 66 engaged with the shrimp tail into the main shell clamping station 40 where the under-belly or ventral side of the shrimp is clamped forwardly of the shrimp tail along the major longitudinal portion of the shrimp by a pair of opposed main shell clamping jaws 78 provided on each holding unit 32.

As shown in FIGS. 4, 7 and 8, the two main shell clamping jaws 78 of each unit 32 are swingably supported on an outer pivot shaft 80 mounted in the central support frame 60 of the holding unit. Two arcuate main shell engaging portions 82 of the respective jaws 78 confront each other in overlying relation to an arcuate shrimp support surface 84 defined by the adjacent unit frame 60 and are continuously urged firmly toward each other by two springs 86 encircling the main jaw support shaft 80, FIG. 8. Movement of the main clamping jaws 78 of each holding unit toward and away from each other in synchronism with rotation of the holding unit is controlled by two stationary inner cams 88 which coact with cam followers 90 fixed to the respective jaws 78.

As each shrimp 76 is moved into the main clamping station 40, two pressure rollers 92 work against the dorsal side of the shrimp to press the ventral side of the shrimp firmly against the arcuate shrimp support surface 84 of the coacting unit 36 where the under-belly or ventral side of the shrimp is firmly clamped by movement of the relatively thin shrimp engaging portions 82 of the main jaws 78 toward each other.

As shown in FIGS. 5 and 8, a tail deflecting element 96 is fixed to the support frame 60 of each unit 32 to occupy a position in which the deflecting element extends outwardly between the tail clamping jaws 66 and the adjacent ends of the main shell clamping elements 82, to aid in deflecting the shrimp tail away from the main portion of the shrimp shell as the latter is removed from the flesh body and tail of the shrimp in the station 48, in a manner to be described. The longitudinal portion of a clamped shrimp which extends over the tail deflecting element 96 from the tail clamping jaws 66 to the main clamping elements 82 is not clamped by either the jaws 66 or the jaws 78.

As previously indicated, the method and machine provided by this invention serve to remove the main portion of the shell of individual shrimp from the body of shrimp flesh, leaving the shrimp tail intact and attached to the flesh body of the shrimp. This necessarily involves a disconnection and separation of the main portion of the shell of each shrimp from the tail of the shrimp which is left attached to the flesh body of the shrimp.

Having reference to the machine structure described, the tail 74 of each shrimp which is to be left attached to the flesh body of the shrimp is clamped by the jaws 66, and the main portion of the shell of the shrimp, which is to be separated from the tail and removed from the flesh body of the shrimp, is clamped along its underside by the main jaw clamping elements 82. For convenient reference, the flesh body of a typical shrimp is identified in the drawings by the reference number 100, and the shell of the shrimp is identified generally by the number 102, FIGS. 4, 7, 12 and 19. The main longitudinal portion of the shrimp shell which is clamped by the main jaw elements 82 and subsequently removed from the flesh body is identified by the number 104, FIGS. 3, 15, 16 and 22.

As each shrimp 76 is carried through the shell disrupting or disjointing zone 42, FIG. 3, a portion of the shrimp shell located near the tail 74 of the shrimp is stretched or tensioned longitudinally with respect to the shrimp until the strength of the shrimp shell is permanently disrupted. Preferably, this is done in a manner which disjoints the shrimp shell 102 near the shrimp tail 74. Moreover, the permanent disruption of the strength of the shrimp shell near the tail of the shrimp is effected by longitudinal tension force applied to the shell 102 of the shrimp in a manner which effectively avoids substantial weakening of the adjacent portion of the flesh body of the shrimp which holds the shrimp tail attached to the flesh body of the shrimp.

The portion of the shrimp shell which is to be disrupted is strained beyond the point or condition of disruption by tension force applied to the shrimp shell 102 in a manner that substantially avoids compressive crushing of the shrimp shell and damage by compression to the adjacent portion of the flesh body 100 of the shrimp.

To this end, longitudinal tension force is applied to each shrimp shell through non-slip connections made to the shrimp shell 102 in a manner which strikingly minimizes compressive loading of the shrimp shell.

In the preferred construction illustrated, shell tensioning forces are applied to each shrimp shell 102 by non-slip shell clutches, to be described, carried by two opposed clutch jaws 108, 110 pivotally supported on two pivot pins 112, 114 mounted in the lower edges of the respective main jaws 78, FIGS. 4, 7 and 8.

As shown, non-slip connections are made to each shrimp shell 102 by two pairs of shell engaging elements or shell clutches 116, 118. One shell engaging element or clutch of each of the two pairs of clutches 116, 118 is carried by each of the two clutch jaws 108, 110 for engagement with a shrimp shell.

As viewed in FIG. 4, the two clutch jaws 108, 110 are formed as generally C-shaped mirror images of each other and extend from the support pivots 112, 114 outwardly around the two main clamping jaws 78. The outer ends of the clutch jaws are turned toward each other to confront opposite sides of the position occupied by a shrimp 76 clamped on the holding unit, in the manner described.

The first pair of shell connecting elements or clutches 116 have stationary positions on the respective clutch jaws 108, 110 and are located on the jaws 108, 110 between the second pair of clutches 118 and the tail clamping jaws 66 to engage opposite sides of a shrimp shell 102 near the tail clamping jaws 66.

The other pair of shell connecting elements or clutches 118 are formed on two levers or dogs 120 swingably mounted on the respective clutch jaws 108, 110 by pivot pins 122. Each lever or dog 120 is urged by a spring 124 to a normal position in which the clutch 118 on the dog 120 abuts against the adjacent clutch 116, as shown in FIGS. 5 and 11.

In the preferred construction illustrated, each dog biasing spring 124 has a central loop 126, FIG. 10, encircling a projecting portion of the dog pivot pin 122, FIG. 11, to hold the spring in place. Opposite ends of each spring 124 extend from the central spring loop 126 and engage respectively an anchoring stud 128 on the corresponding one of the clutch jaws 108, 110, FIGS. 5, 10 and 11, and a cam follower button 130 secured by a screw 132 to the corresponding dog 120.

Each cam follower button 130 is formed preferably of a suitable plastics material, such for example as nylon, and is held against rotation on its clutch dog 120 by a small pin 134 extending outwardly from the corresponding clutch dog 120 into one of two openings 136 in the follower button. As shown, each follower button 130 has a generally circular shape truncated along a generally straight inner edge 138, FIG. 10, which defines a groove 140 that receives the adjacent end of the coacting spring 124. An arcuate peripheral edge 142 of each follower button 130 projects outwardly beyond the adjacent portion of the corresponding dog 120 for engagement by a coacting cam, as will be explained.

Each clutch dog 120 can be accurately visualized functionally as constituting a bell-crank swingable about its support pivot 122 and having two legs, one of which supports the corresponding cam follower button 130 and the other of which is constructed to define the corresponding shrimp shell clutch 118.

Each of the shell clutches 116 comprises two needle sharp anchoring tines or short spikes 144, FIGS. 9 and 10, mounted on the corresponding one of the clutch jaws 108, 110 to project toward the adjacent shell 102 of a shrimp 76 clamped on the corresponding holder unit 32, FIG. 4. Preferably, one of the tines or needle elements 144 on each clutch 116 is located radially outward of the other needle element with reference to the axis of the rotor 56, as shown in FIGS. 4 and 5. For convenience, the axis of the rotor 56 is identified in FIG. 3 by the number 146.

Each of the needle sharp elements 144 is formed of a very hard metal and, in the preferred construction illustrated most clearly in FIG. 9, has a cylindrical base 148 which is securely mounted on the coacting clutch jaw.

Each of the shell engaging clutches 118 comprises four needle sharp tines or needle elements 150 located in a generally trapezoidal pattern, FIG. 10, with two of the needle elements 150 positioned radially outward with respect to the two other elements 150. As shown in FIG. 8, the two needle elements 150, which are nearest to the adjacent clutch 116, have a spacing from each other that exceeds the spacing from each other of the other two needle elements 150 which are more remote from the adjacent clutch 116.

The two clutch jaws 108, 110 are continuously urged away from the main clamping jaws 78 by two helically spiraled compression springs 155 which force the respective clutch jaws into engagement with two motion limiting abutments 160 carried by the respective clamping jaws 78.

As will presently appear, the two springs 155 not only serve to hold the jaws 108, 110 apart to receive a shrimp therebetween, but also serve to advantage in minimizing the compressive load subsequently applied to a shrimp as its shell is stretched and tensioned to disrupt its strength.

Before each shrimp 76 is fully clamped in a holding unit 32, the two pairs of clutches 116, 118 on the holding unit are spaced apart out of engagement with the shrimp. As the shrimp is carried, after clamping, on into the shell disjointing zone 42, two outboard cam followers 154 on the clutch jaws 108, 110 move into engagement with two opposed cams 156, which together form a constrictive throat 158 through whicch the two followers 154 must pass in the zone 42. See FIGS. 3, 6, 7, 11, 13 and 15.

The cams 156 swing the clutch jaws 108, 110 toward each other, causing the needle-like points of the sharp clutch tines 144 of the clutches 116 and the sharp clutch tines 150 of the clutches 118 to puncture opposing portions of the intervening shrimp shell 102. See FIGS. 13 and 14. The two small puncture holes made by one of the clutches 116 in a shrimp shell are indicated in FIG. 14 by the number 164. The four small puncture holes made by the sharp tines or needle elements 150 of an adjacent clutch element 118 are indicated in FIG. 14 by the number 166.

Because of their small size and needle-like sharpness, the shell engaging elements 144 and 150 of the clutches 116, 118 establish firm non-slip connections with adjacent portions of a shrimp shell 102 without subjecting the shrimp shell to compressive loads which would damage the underlying flesh body of the shrimp.

It will be observed, with reference to FIG. 13, that the pivot pin 122 for each swingable clutch dog 120 is located with reference to the position of a shrimp on the corresponding holding unit 32 forwardly of the shrimp shell clutch 118 on the dog 120. Put another way, the position of each clutch dog pivot 122 in relation to the corresponding clutch 118 is such that the clutch 118 occupies, with reference to the central longitudinal plane of the corresponding holding unit 32, a position between the dog pivot 122 and the adjacent clutch 116.

This positional relationship of each clutch dog pivot 122 to coacting structure is of advantage, in that it causes the outward reaction of a shrimp shell on the corresponding clutch 118, as the clutch 118 is engaged with the shrimp shell, to supplement the action of the coacting spring 124 to hold the clutch 118 in its normal position in which its structure abuts against that of the adjacent clutch 116. Hence, even though each clutch dog 120 is normally held in its normal position only by the yieldable force of a spring 124, the clutch dog 120 is firmly stabilized in its normal position during engagement of the corresponding clutch 118 with a shrimp shell by virtue of the effect which the reaction of the shrimp shell on the clutch 118 has in stabilizing the dog 120 in its normal position.

As shown in FIGS. 5, and 11 to 13, the positional relationship of the shell clutches 116, 118 of each holding unit 32 to other components of the holding unit is such that the needle elements or tines 144 of the clutches 116 engage a segment 174, FIGS. 12 and 14, of each shrimp shell 102 adjoining the shrimp tail 74 and the needle elements or tines 150 of the clutches 118 engage the shell segment 176 immediately adjacent the shell segment 174. The two shell segments 174, 176 engaged by the two pairs of clutches 116, 118 are adjoined to each other by a shell joint 178.

After the clutches 116, 118 of each holding unit 32 are engaged with a shrimp shell by the action of the cams 156 on the cam followers 154, as described, the continuing movement of the holding unit brings the cam followers 130 into engagement with a second pair of opposed cams 180, FIGS. 3, 6 and 13. The two cams 180 move the two cam followers 130 on the clutch dogs 120 toward each other, as shown in FIG. 15. This movement of the followers 130 swings the two clutch dogs 120 of each holding unit 32 in opposite directions away from the normal positions of the dogs 120 to effect movement of the two corresponding shell clutches 118 away from the adjacent shell clutches 116 and away from the clamped tail 74 of the shrimp.

Swinging of the dogs 120 as described has the desired effect of applying to the clutched shrimp shell segment 176, FIGS. 14 and 16, tension force acting longitudinally along the corresponding shrimp away from the clamped and clutched tail end portion of the shrimp. The longitudinal tension force applied to the clutched shrimp shell segment 176 is opposed by cumulative restraining forces applied to the shrimp tail 74, which is clamped by the jaws 66, and the adjacent shrimp shell segment 174, which is engaged by the clutches 116. As a consequence, the clutches 118 apply to the shrimp shell joint 178 a longitudinal tension force acting forwardly with respect to the shrimp and the tail jaws 66 and the clutches 116 apply to the shrimp at the tail side of the shell joint 178 and opposing tension force acting rearwardly with respect to the shrimp.

The forward displacement of the clutches 118 with respect to the clutches 116 and tail clamping jaws 66 is sufficient to cause disruption of the strength of the shrimp shell between the two pairs of clutches 118, 116 by the tension applied to the intervening portion of the shrimp shell. As shown in FIG. 16, the forward displacement of the shrimp shell segment 176 with reference to the shrimp and relative to the shell segment 174 effects an effective rupturing or disjointing of the intervening shell joint 178.

It should be observed that the portion of the shrimp shell 102 which is disrupted or disjointed in the manner described extends between the tail clamping jaws 66 and the main shell clamping elements 78 in generally overlying relation to the tail deflecting element 96, FIG. 8.

After the shell of the shirmp is disjointed in the manner described, the cam followers 130 soon pass beyond the short cams 180, allowing the dogs 120 to return to their normal positions, and the cam followers 154 pass beyond the cams 156, allowing the springs 155 to swing the clutches 116, 118 out of engagement with the shrimp shell.

It will be appreciated that the action of the cams 180 in moving the cam followers 130 toward each other, to produce the desired swinging action of the dogs 120 tends to press the clutches 116, 118 against opposite sides of the coacting shrimp. However, this action of the cams 180 in tending to move the clutch jaws 108, 110 toward each other is opposed by the springs 155 which act against the cams 156. Because of the action of the springs 155, it is not necessary that the shrimp sustain the full load of the cams 180 in moving the cam followers 130 toward each other. The result is to minimize the compressive load on the shrimp, thus avoiding damage to the flesh body of the shrimp.

From the shell disrupting or disjointing zone 42, FIGS. 3 and 6, each shrimp is carried by the continuing movement of its supporting unit 32 into the shell ripping and deveining station 44, where the dorsal side of the shrimp shell 102 is ripped open and the sand vein 186 of the shrimp is dug out by a rotary serrated element 188, FIGS. 6 and 19. The element 188 is supported by a swingable arm 190 for movement into engagement with a shrimp shell by a weight 192, as illustrated in FIG. 6. For a full disclosure of the structure used to support and drive the rotary shell ripping and deveining element 188, reference can be made to the previously mentioned application Serial No. 41,304. Cylindrical roller elements 194 project axially in opposite directions from the serrated shell ripping and deveining element 188, to aid in achieving an optimum deveining action on each passing shrimp 76.

From the shell ripping and deveining station 44, each shrimp is carried to the debris removing station 46, where the open dorsal side of the shrimp is scrubbed by a rotary brush 200, FIGS. 3, 21 and 22 with the aid of a jet of water played onto the shrimp from a nozzle 202, to wash away the debris leaving the shrimp clean.

After being scrubbed and washed in the station 46, each shrimp 76 passes to the shell removing station 48 where the main portion 104 of the shrimp shell is slipped longitudinally off the cleaned flesh body of the shrimp, leaving the shrimp tail 74 firmly attached to the flesh body 100.

As each shrimp 76 enters the shell removing station 48, the cams 72 operate to release the tail of the shrimp from the clamping jaws 66. Just as each shrimp comes into full alignment with the shell removing station 48, a plurality of flesh body and tail holding tines, indicated in FIGS. 3, 17 and 18 generally by the number 210, spring up into engagement with the shrimp body and tail. All of the tines 210 extend vertically up through a stripper plate 212, FIG. 3, from a common horizontal support bar 214. The bar 214 is operated in synchronism with rotary movement of the holder units 32 by mechanism fully disclosed in the previously mentioned application Serial No. 41,304.

As each shrimp 76 enters the shell removing station 48, it is moving tail first from left to right with reference to FIGS. 3, 17 and 18.

As shown in FIGS. 17 and 18, four of the tines 210, which are specifically identified by the number 216, are arranged in a straight line positioned so that, upon upward movement of all of the tines 210, the four tines 216 pierce the main body 100 of the shrimp flesh, as illustrated.

Four of the tines 210, specifically identified in FIGS. 17 and 18 by the number 218, are arranged in a trapezoidal pattern, as illustrated in FIGS. 17 and 18, to form a cup or receiver 220 designed to receive and generally embrace the tail end of a shrimp, which end is, with respect to the direction of movement of the shrimp, the leading end of the shrimp as it is carried into the station 48. Thus, the four tines 218 which form the receiver 220 are located at the right-hand end of the straight line of tines 216, with reference to FIGS. 3, 17 and 18. The two tines 218 most remote from the tines 216 are spaced apart somewhat to straddle or pierce, if necessary, a shrimp tail 74. The other two tines 218 which are located nearer to the straight line of tines 216 have a somewhat wider spacing from each other, to generally straddle the shrimp shell segment 174 which is to remain attached to the shrimp body 100 along with the shrimp tail 74.

Thus, the receiver 220 formed by the four tines 218 has a relatively wide end opening toward the head or thicker end of a coacting shrimp. Hence, the receiver or cup 220 effectively spans and embraces the tail end portion of a shrimp which is to remain attached to the flesh body 100 of the shrimp.

The tines 218 forming the receiver or cup 200 cooperate with straight line of tines 216 to hold temporarily the flesh body and tail of the shrimp against continued movement while the main clamping jaws 78 of the coacting unit 32 continue to move the main shrimp shell portion 104. Continued movement of the adjacent holder unit 32 causes the tail deflector 96 of the unit to cam the tail and last segment 174 of the shrimp shell downwardly further into the receiver 220 and slip the tail portion 104 longitudinally off the flesh body 100 past the tail of the shrimp.

The flesh body and tail of the shrimp remain on the tines 210. The bar 214 moves the tines 210 downwardly through the stripper plate 212, which frees the cleaned shrimp from the tines.

As each unit 32 reaches the shell releasing station 50, the cams 88 open the jaws 78, allowing the empty shrimp shell 104 to drop off, whereupon the empty unit 32 passes by the cleaning brush 52 to the pickup station 36 to continue the cycle.

As illustrated in FIG. 1, shrimp to be cleaned are conveniently supplied to the machine 30 by a conveyor 230, from which the shrimp are removed and placed by hand in an endless series of feeding trays 232 which form the previously mentioned conveyor means 38 that supplies shrimp to the pickup station 36 in timed relation to movement of the pickup units 32 to the station 36.

It will be noted, with reference to FIGS. 1 and 2, that an upper horizontal run of the conveyor means 38 is generally flush with a shrimp loading apron 234 which serves as a convenient aid in the manual loading of shrimp into the trays 232. Each tray 232 extends past the apron 234 in a generally horizontal position and has an open rear end from which the tail 74 of a shrimp loaded into the tray projects to be clamped by a pair of tail clamping jaws 66 of a unit 32 when the shrimp is moved by the tray into the pickup station 36. For a detailed disclosure of the means used to operate the conveyer means 38 in synchronism with rotation of the units 32, reference can be made to the previously mentioned application Serial No. 41,304.

It will be appreciated that the invention is not necessarily limited to use of the particular construction illustrated, but includes the use of alternatives and equivalents within the spirit and scope of the invention as defined by the claims.

The invention is claimed as follows:

1. The method of cleaning shrimp comprising, moving along a predetermined path a procession of shrimp each of which is firmly gripped along the ventral side of the main portion of the shrimp shell by gripping means that leaves the tail of the shrimp free of the gripping means, cutting open longitudinally the shell of each shrimp moving along said path, clutching the shell of each shrimp while it is moving at two positions on the shrimp shell disposed on opposite sides of a shell joint located adjacent the shrimp tail; applying to the shell of each shrimp at the two positions where the shrimp shell is clutched two forces acting away from each other in directions generally parallel to the adjacent flesh body of the shrimp to disjoint, while the shrimp is moving, the shell joint intervening between the positions where the shell is clutched; and holding the flesh body and tail of each shrimp against movement along the path while continuing movement of the main portion of the shell of the shrimp along the path by the gripping means gripping the ventral side of the main portion of the shrimp shell to effect, by longitudinal movement of the shell relative to the flesh body, separation of the main portion of the shrimp shell from the flesh body and tail of the shrimp leaving the shrimp tail attached to the flesh body.

2. The method of cleaning shrimp comprising slitting open longitudinally the shell of each individual shrimp; forcibly moving in relation to each other two shell portions of each individual shrimp to effect substantially complete rupturing of the shell connection between the two shell portions; maintaining, until the shell connection between said shell portions is ruptured by said forced movement of said shell portions in relation to each other, the natural and original shell connection of said shell portions fully intact and undiminished in longitudinal tension strength, except for such weakening of the shell as may attend longitudinal opening of the shell; one of said shell portions being a rearmost shell portion including the shrimp tail and the other of said shell portions being located along the shrimp immediately forward of said rearmost shell portion, and separating the flesh body of the shrimp with the tail attached thereto from the main portion of the shrimp shell located with reference to the shrimp forwardly of said rearmost shell portion.

3. The method of cleaning shrimp comprising, gripping each of a succession of shrimp along the ventral side of the main portion of the shrimp shell by gripping means that leaves the tail of the shrimp free of the gripping means, moving each shrimp in the grip of the coacting gripping means along a predetermined path, cutting open longitudinally the shell of each shrimp moving along said path, applying to the shell of each shrimp at two positions on the shrimp shell disposed on opposite sides of a shell joint located adjacent the shrimp tail two forces acting in opposite directions to disjoint the shrimp shell adjacent the shrimp tail, and moving the flesh body and tail of the shrimp longitudinally in relation to the main portion of the shrimp shell gripped by the gripping means to effect separation of the main portion of the shrimp shell from the flesh body and tail leaving the shrimp tail attached to the flesh body.

4. The method of cleaning shrimp comprising, piercing at least partially two portions of the shell of individual shrimp to establish non-slip connections with said respective shell portions, said shell portions being firmly connected together by intervening shell structure previously undiminished in strength by lateral rupturing of the shrimp shell, one of said shell portions being a rearmost shell portion including the shrimp tail and the other of said shell portions being located along the shrimp immediately forward of said rearmost shell portion; moving the two shell portions relative to each other to effect substantially complete rupturing of the connection between the two shell portions which remain, until moved in relation to each other, firmly connected together by the intervening shell structure undiminished in strength by lateral rupturing of the shrimp shell; and separating the flesh body of the shrimp with the tail attached thereto from the main portion of the shrimp shell located with reference to the shrimp forwardly of said rearmost portion of the shrimp shell.

5. The method of cleaning shrimp comprising, gripping each of a succession of shrimp along the ventral side of the main portion of the shrimp shell by gripping means that leaves the tail of the shrimp free of the gripping means, moving each shrimp in the grip of the coacting gripping means along a predetermined path, cutting open longitudinally the shell of each shrimp moving along said path; forcibly moving in opposite directions in relation to each other two longitudinally spaced portions of the shrimp shell, located near the shrimp tail, to effect substantially complete rupturing of the shell connection between the two shell portions; maintaining, until the shell connection between said shell portions is ruptured by said forced movement of said shell portions in relation to each other, the natural and original shell connection of said shell portions fully intact and undiminished in longitudinal tension strength, except for such weakening of the shell as may attend longitudinal opening of the shell; and moving the flesh body of the shrimp, with the tail attached thereto, in relation to the main portion of the shrimp shell gripped by the gripping means to effect separation of the main portion of the shrimp shell from the flesh body and tail leaving the shrimp tail attached to the flesh body.

6. The method of cleaning shrimp comprising slitting open longitudinally the shell of each individual shrimp; forcibly moving away from each other two shell portions of each individual shrimp to effect substantially complete rupturing of the shell connection between the two shell portions; maintaining, until the shell connection between said shell portions is ruptured by said forced movement of said shell portions in relation to each other, the natural and original shell connection of said shell portions fully intact and undiminished in longitudinal tension strength, except for such weakening of the shell as may attend longitudinal opening of the shell; one of said shell portions being a rearmost shell portion including the shrimp tail and the other of said shell portions being located along the shrimp immediately forward of said rearmost shell portion, and separating the flesh body of the shrimp with the tail attached thereto from the main portion of the shrimp shell located with reference to the shrimp forwardly of said rearmost shell portion.

7. The method of cleaning shrimp comprising forming non-slip connections with two portions of the shell of individual shrimp, said shell portions being firmly connected together by intervening shell structure previously undiminished in strength by lateral rupturing of the shrimp shell, one of said shell portions being a rearmost shell portion including the shrimp tail and the other of said shell portions being located along the shrimp immediately forward of said rearmost shell portion; moving the two shell portions relative to each other to effect substantially complete rupturing of the connection between the two shell portions which remain, until moved in relation to each other, firmly connected together by the intervening shell structure undiminished in strength by lateral rupturing of the shrimp shell; and separating the flesh body of the shrimp with the tail attached thereto from the main portion of the shrimp shell located with reference to the shrimp forwardly of said rearmost portion of the shrimp shell.

8. The method of cleaning shrimp comprising; engaging two portions of the shell of individual shrimp, which shrimp shell portions are located on opposite sides of a shrimp shell joint disposed near the tail of the shrimp and are firmly joined and firmly connected to each other by the intervening joint structure of the shell undiminished in strength by lateral rupturing of the shrimp shell; forcibly moving the two engaged shell portions away from each other a limited distance to effect disjointing of the two shell portions by applied tension force, maintaining the shell connection between the two shell portions undiminished in longitudinal strength by lateral rupturing of the shrimp shell until the two shell portions are disjointed by said movement of the two shell portions away from each other, and separating the flesh body of the shrimp with the tail attached thereto from the main portion of the shrimp shell located with reference to the shrimp forwardly of the joint intervening between the two first mentioned portions of the shrimp shell.

References Cited by the Examiner

UNITED STATES PATENTS

| 2,716,776 | 9/1955 | Streich et al. | 17—2 |
| 2,784,450 | 3/1957 | Jonsson | 17—2 |

SAMUEL KOREN, *Primary Examiner.*

LUCIE H. LAUDENSLAGER, *Examiner.*